(12) United States Patent
Chin et al.

(10) Patent No.: US 8,185,138 B2
(45) Date of Patent: May 22, 2012

(54) PAGING MESSAGES FOR POWER SAVING IN A MOBILE WIMAX SYSTEM

(75) Inventors: Tom Chin, San Diego, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 672 days.

(21) Appl. No.: 12/250,189

(22) Filed: Oct. 13, 2008

(65) Prior Publication Data
US 2010/0093378 A1 Apr. 15, 2010

(51) Int. Cl.
*H04B 1/16* (2006.01)
*H04B 1/38* (2006.01)
*H04M 3/00* (2006.01)
*H04M 1/00* (2006.01)
*H04W 4/00* (2009.01)
*H04W 68/00* (2009.01)
*G08C 17/00* (2006.01)

(52) U.S. Cl. .................. 455/458; 455/343.2; 455/343.4; 455/418; 455/426.1; 455/574; 370/311

(58) Field of Classification Search ................ 455/404.2, 455/410–411, 418–419, 422.1, 423, 456.1–456.2, 455/343.1–343.4, 458, 500–503, 550.1, 556.2, 455/560–561, 574, 127.5, 343.2–343.4, 420, 455/426.1, 432.3, 434, 435.1, 435.3, 466, 455/512–515, 517–521; 370/331–332, 311–313, 370/349–350
See application file for complete search history.

(56) References Cited

U.S. PATENT DOCUMENTS

| | | | |
|---|---|---|---|
| 5,404,355 A * | 4/1995 | Raith | 370/311 |
| 6,438,375 B1 * | 8/2002 | Muller | 455/435.3 |
| 7,061,879 B2 * | 6/2006 | Oprescu-Surcobe et al. | 370/311 |
| 7,630,729 B2 * | 12/2009 | Kim et al. | 455/515 |
| 7,636,563 B2 | 12/2009 | Kim et al. | |
| 7,636,577 B2 * | 12/2009 | Mohanty et al. | 455/458 |
| 7,660,578 B2 * | 2/2010 | Viitamaki et al. | 455/426.2 |
| 2002/0090959 A1 * | 7/2002 | Laroia et al. | 455/458 |
| 2006/0160558 A1 | 7/2006 | Kim et al. | |

(Continued)

FOREIGN PATENT DOCUMENTS
WO  WO0169859 A1  9/2001

OTHER PUBLICATIONS
International Search Report & Written Opinion—PCT/US2009/059142, International Search Authority—European Patent Office—Apr. 22, 2010.

(Continued)

*Primary Examiner* — Meless Zewdu
(74) *Attorney, Agent, or Firm* — Paul Kuo

(57) ABSTRACT

Certain embodiments of the present disclosure provide a paging schedule that may allow a WiMAX mobile device to return to a low power state prior to the end of a listening interval, thereby reducing power consumption. For certain embodiments, the paging schedule may be controlled by a base station using standardized paging messages, with paging messages targeting particular MSs in a group presented in an organized manner within a listening interval. An MS aware of this schedule may, thus, promptly return to a low power state prior to the end of a listening interval if it does not detect a paging message at its expected time within the listening interval.

28 Claims, 12 Drawing Sheets

U.S. PATENT DOCUMENTS

| | | | |
|---|---|---|---|
| 2007/0087767 A1* | 4/2007 | Pareek et al. | 455/502 |
| 2007/0184836 A1* | 8/2007 | HC | 455/434 |
| 2007/0191031 A1* | 8/2007 | Mohanty et al. | 455/458 |
| 2007/0254648 A1* | 11/2007 | Zhang et al. | 455/433 |
| 2007/0270118 A1* | 11/2007 | Subramanian et al. | 455/343.2 |
| 2008/0004044 A1* | 1/2008 | Simpson et al. | 455/458 |
| 2008/0025250 A1* | 1/2008 | Wang et al. | 370/328 |
| 2008/0043656 A1 | 2/2008 | Yoon et al. | |
| 2008/0075026 A1* | 3/2008 | Son et al. | 370/311 |

OTHER PUBLICATIONS

Partial International Search Report—PCT/US2009/059142, International Search Authority—European Patent Office—Feb. 17, 2010.

* cited by examiner

PAGING MESSAGES FOR POWER SAVING IN A MOBILE WIMAX SYSTEM

TECHNICAL FIELD

Certain embodiments of the present disclosure generally relate to wireless communication and, more particularly, to idle mode operations.

BACKGROUND

Mobile WiMAX standards define an idle mode during which a mobile station (MS) may power down components in an effort to conserve power. In the idle mode, the MS powers up components to monitor for page messages in recurring MS Paging Listening ("listening") intervals, while powering down components in MS Paging Unavailable ("sleep") intervals.

In a mobile WiMAX network, each WiMAX frame has a 24-bit frame number that increments every frame until the maximum is reached before restarting from zero. This frame number can be used to decide when a Base Station (BS) should send a BS Broadcast Paging (MOB_PAG-ADV) message, at some Paging_Offset within a periodic Paging_Cycle. To synchronize with the paging cycle of a BS, the MS may start to listen for the MOB_PAG-ADV message from frame number N when:

$$N \bmod \text{Paging\_Cycle} = \text{Paging\_Offset} \quad (1)$$

Each MOB_PAG-ADV message may contain one or more 24-bit MAC Address Hash (i.e., generated as a hashed value of the full 48-bit MAC address of a targeted MS). When an MS sees a MOB_PAG-ADV message containing a match with its 24-bit MAC Address Hash (generated with its own 48-bit MAC address), the MS knows that this MOB_PAG-ADV message is destined for itself.

Unfortunately, an MS needs to stay awake for the whole paging listening interval to determine if a MOB_PAG-ADV message contains a match with its MAC address hash. Per WiMAX standards, a paging listening interval L can be as long as 5 frames, which may result in a substantial waste in terms of power consumption in the event that the MS is not paged.

SUMMARY

Certain embodiments of the present disclosure provide a method of scheduling paging messages in a wireless communications system. The method generally includes negotiating paging parameters for a group of mobile stations in idle mode, wherein the paging parameters comprise a common listening interval for mobile stations in the group, receiving paging messages targeting mobile stations in the group, determining an order for transmitting the paging messages within a listening interval, wherein the order specifies a sequential order for transmitting paging messages targeting mobile station in different groups, and transmitting the paging messages, by group, in the determined order.

Certain embodiments of the present disclosure provide a method of monitoring for paging messages by a mobile station in a wireless communications system. The method generally includes exiting a lower power state of an idle mode to monitor for paging messages during a current listening interval, determining a group number for the mobile station, determining an order of group numbers to receive paging messages in a current listening interval, and returning to a low power state prior to the end of the current listening interval, in response to determining that a frame in the listening interval contains a mobile page advertisement message that does not target the mobile station and does target a mobile station in a group that occurs later in the determined order of group numbers than the group number determined for the mobile station.

Certain embodiments of the present disclosure provide an apparatus for scheduling paging messages in a wireless communications system The apparatus generally includes logic for negotiating paging parameters for a group of mobile stations in idle mode, wherein the paging parameters comprise a common listening interval for mobile stations in the group, logic for receiving paging messages targeting mobile stations in the group, logic for determining an order for transmitting the paging messages within a listening interval, wherein the order specifies a sequential order for transmitting paging messages targeting mobile station in different groups, and logic for transmitting the paging messages, by group, in the determined order.

Certain embodiments of the present disclosure provide an apparatus of monitoring for paging messages by a mobile station in a wireless communications system. The apparatus generally includes logic for exiting a lower power state of an idle mode to monitor for paging messages during a current listening interval, logic for determining a group number for the mobile station, logic for determining an order of group numbers to receive paging messages in a current listening interval, and logic for returning to a low power state prior to the end of the current listening interval, in response to determining that a frame in the listening interval contains a mobile page advertisement message that does not target the mobile station and does target a mobile station in a group that occurs later in the determined order of group numbers than the group number determined for the mobile station.

Certain embodiments of the present disclosure provide an apparatus for scheduling paging messages in a wireless communications system. The apparatus generally includes means for negotiating paging parameters for a group of mobile stations in idle mode, wherein the paging parameters comprise a common listening interval for mobile stations in the group, means for receiving paging messages targeting mobile stations in the group, means for determining an order for transmitting the paging messages within a listening interval, wherein the order specifies a sequential order for transmitting paging messages targeting mobile station in different groups, and means for transmitting the paging messages, by group, in the determined order.

Certain embodiments of the present disclosure provide an apparatus for monitoring for paging messages by a mobile station in a wireless communications system. The apparatus generally includes means for exiting a lower power state of an idle mode to monitor for paging messages during a current listening interval, means for determining a group number for the mobile station, means for determining an order of group numbers to receive paging messages in a current listening interval, and means for returning to a low power state prior to the end of the current listening interval, in response to determining that a frame in the listening interval contains a mobile page advertisement message that does not target the mobile station and does target a mobile station in a group that occurs later in the determined order of group numbers than the group number determined for the mobile station.

Certain embodiments of the present disclosure provide a computer-program product for scheduling paging messages in a wireless communications system, comprising a computer readable medium having instructions stored thereon, the instructions being executable by one or more processors. The instructions generally include instructions for negotiating paging parameters for a group of mobile stations in idle mode, wherein the paging parameters comprise a common listening interval for mobile stations in the group, instructions for receiving paging messages targeting mobile stations in the group, instructions for determining an order for transmitting the paging messages within a listening interval, wherein the order specifies a sequential order for transmitting paging messages targeting mobile station in different groups, and instructions for transmitting the paging messages, by group, in the determined order.

Certain embodiments of the present disclosure provide a computer-program product for monitoring for paging messages by a mobile station in a wireless communications system, comprising a computer readable medium having instructions stored thereon, the instructions being executable by one or more processors. The instructions generally include instructions for exiting a lower power state of an idle mode to monitor for paging messages during a current listening interval, instructions for determining a group number for the mobile station, instructions for determining an order of group numbers to receive paging messages in a current listening interval, and instructions for returning to a low power state prior to the end of the current listening interval, in response to determining that a frame in the listening interval contains a mobile page advertisement message that does not target the mobile station and does target a mobile station in a group that occurs later in the determined order of group numbers than the group number determined for the mobile station.

In certain embodiments, transmitting the paging messages, as presented above in one or more summary paragraphs, includes transmitting the paging messages in accordance with one or more standards of the Institute of Electrical and Electronics Engineers (IEEE) 802.16 family of standards.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Embodiments of the present disclosure provide a paging schedule that may allow a WiMAX mobile device to return to a low power state prior to the end of a listening interval, thereby reducing power consumption. For certain embodiments, the paging schedule may be controlled by a base station using standardized paging messages, with paging messages targeting particular MSs in a group presented in an organized manner within a listening interval. An MS aware of this schedule may, thus, promptly return to a low power state prior to the end of a listening interval if it does not detect a paging message at its expected time within the listening interval.

Exemplary Wireless Communication System

The word "exemplary" is used herein to mean "serving as an example, instance, or illustration." Any embodiment described herein as "exemplary" is not necessarily to be construed as preferred or advantageous over other embodiments.

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
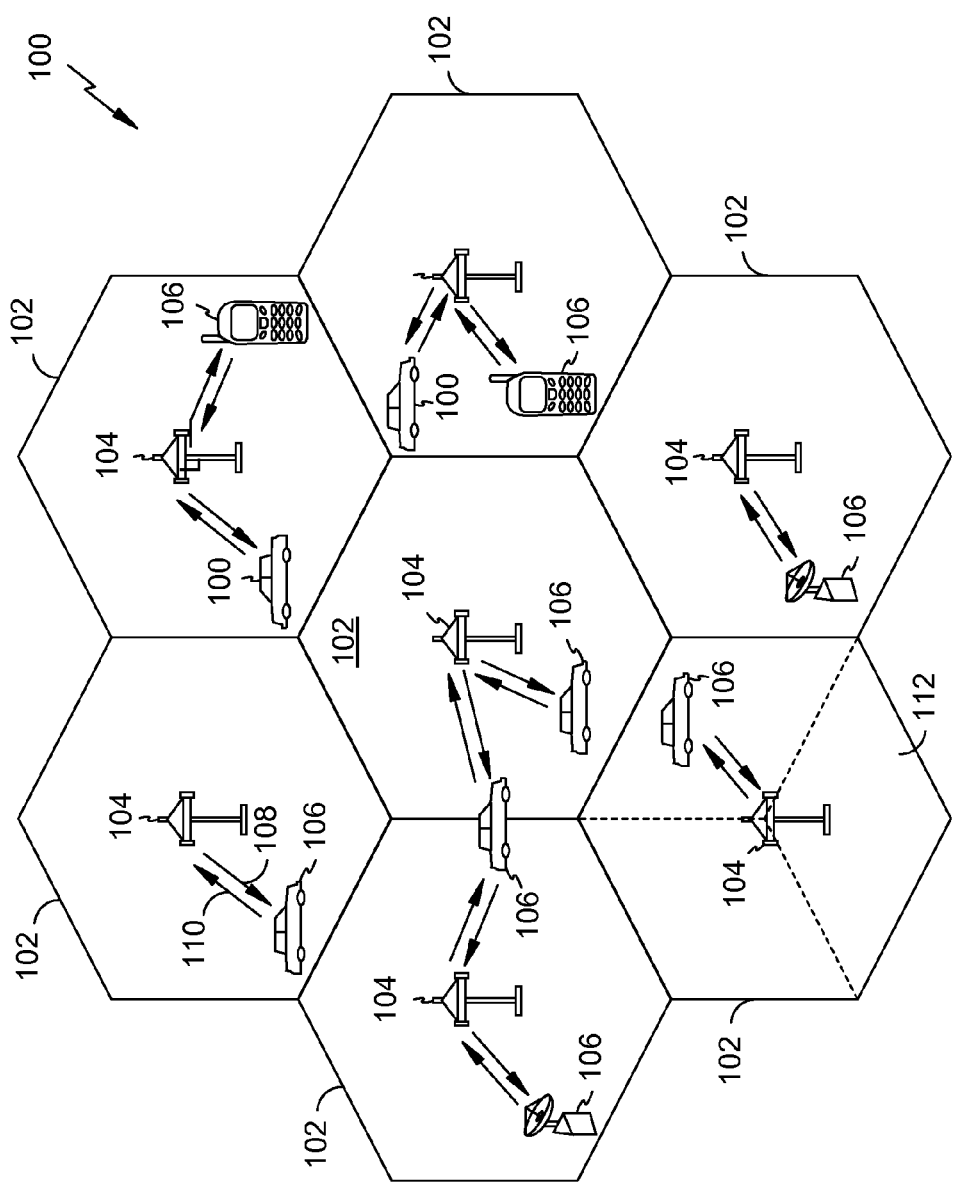
FIG. 1 illustrates an example wireless communication system, in accordance with certain embodiments of the present disclosure.

FIG. 1 illustrates an example of a wireless communication system 100 in which embodiments of the present invention may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
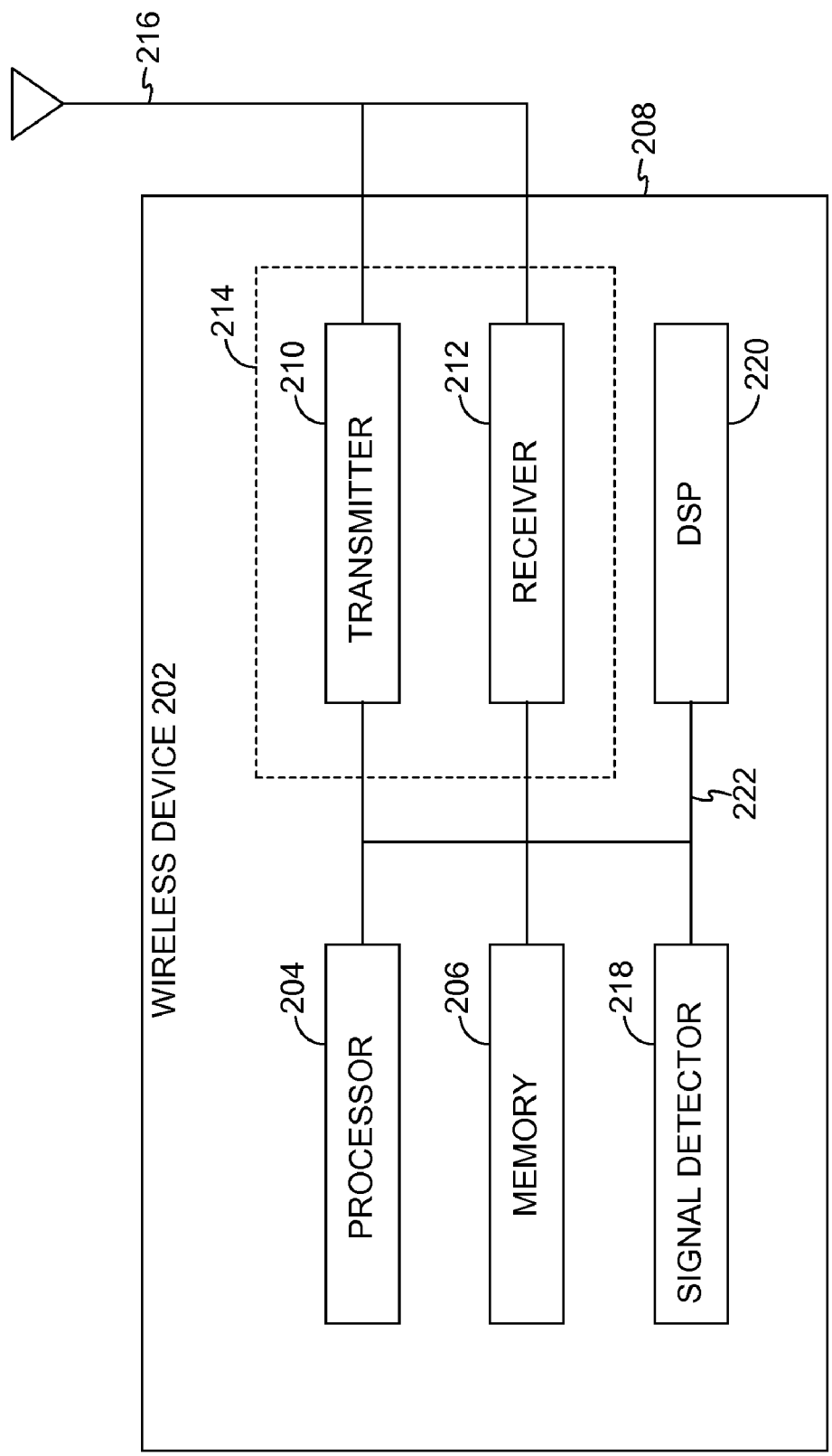
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
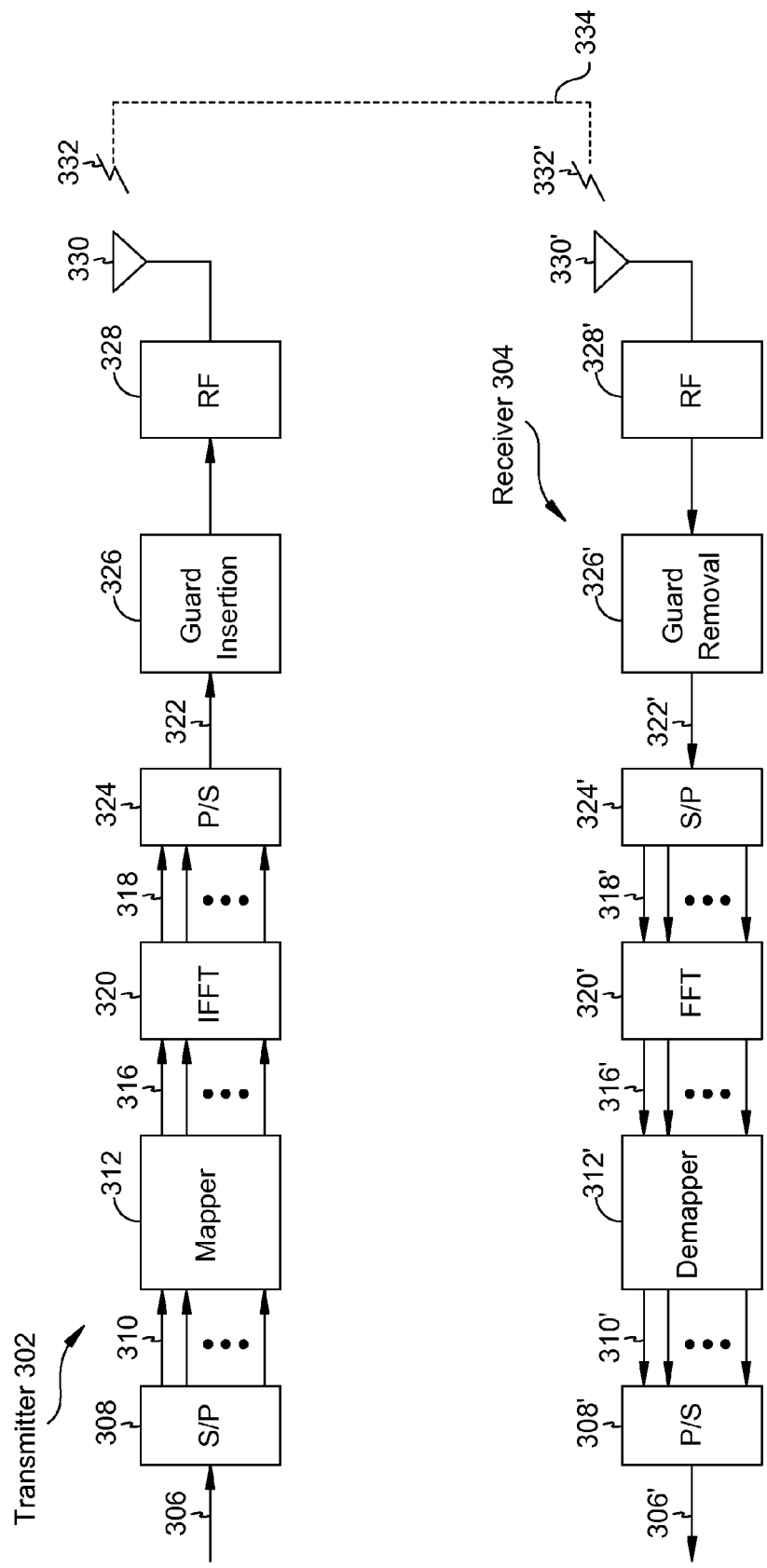
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Power Saving Procedure in a Mobile WiMAX System

Mobile WiMAX standards define an idle mode during which a mobile station (MS) may power down components in an effort to conserve power. In the idle mode, the MS powers up components to monitor for page messages in recurring MS Paging Listening ("listening") intervals, while powering down components in MS Paging Unavailable ("sleep") intervals. During the recurring listening intervals, the MS monitors for BS Broadcast Paging (MOB_PAG-ADV) messages.

Prior to entering the idle mode, the MS may negotiate deregistration with a serving BS. During the deregistration negotiation, the MS and BS may exchange idle mode parameters, enabling the synchronization of MS listening intervals with BS paging intervals. The idle mode parameters may include, for example, a listening cycle which may be MS specific, a paging offset which may be MS specific, the frame number of the BS, and a frame number N at which the MS may start listening for the MOB_PAG-ADV message.

In accordance with Equation (1) above, the frame number N at which the MS may start listening for the MOB_PAG-ADV message, may be determined such that the remainder of the quotient of the frame number N divided by the number of frames in a paging cycle equals a paging offset (N mod Paging_Cycle), where the paging offset is the frame within the paging cycle in which the paging message is transmitted by the BS, according to Equation (1) above.

When a local network receives data traffic destined for an MS in idle mode, an access service network gateway (ASN-GW) may instruct all of the BSs in an associated paging group to broadcast a MOB_PAG-ADV message containing an indication one or more MSs being paged. Each MOB_PAG-ADV message may contain one or more 24-bit MAC Address Hash (i.e., generated as a hashed value of the full 48-bit MAC address of a targeted MS) indicating the MSs being paged. When an MS sees a MOB_PAG-ADV message containing a match with its 24-bit MAC Address Hash (generated with its own 48-bit MAC address), the MS knows that this MOB_PAG-ADV message is destined for itself.

Figure 4:
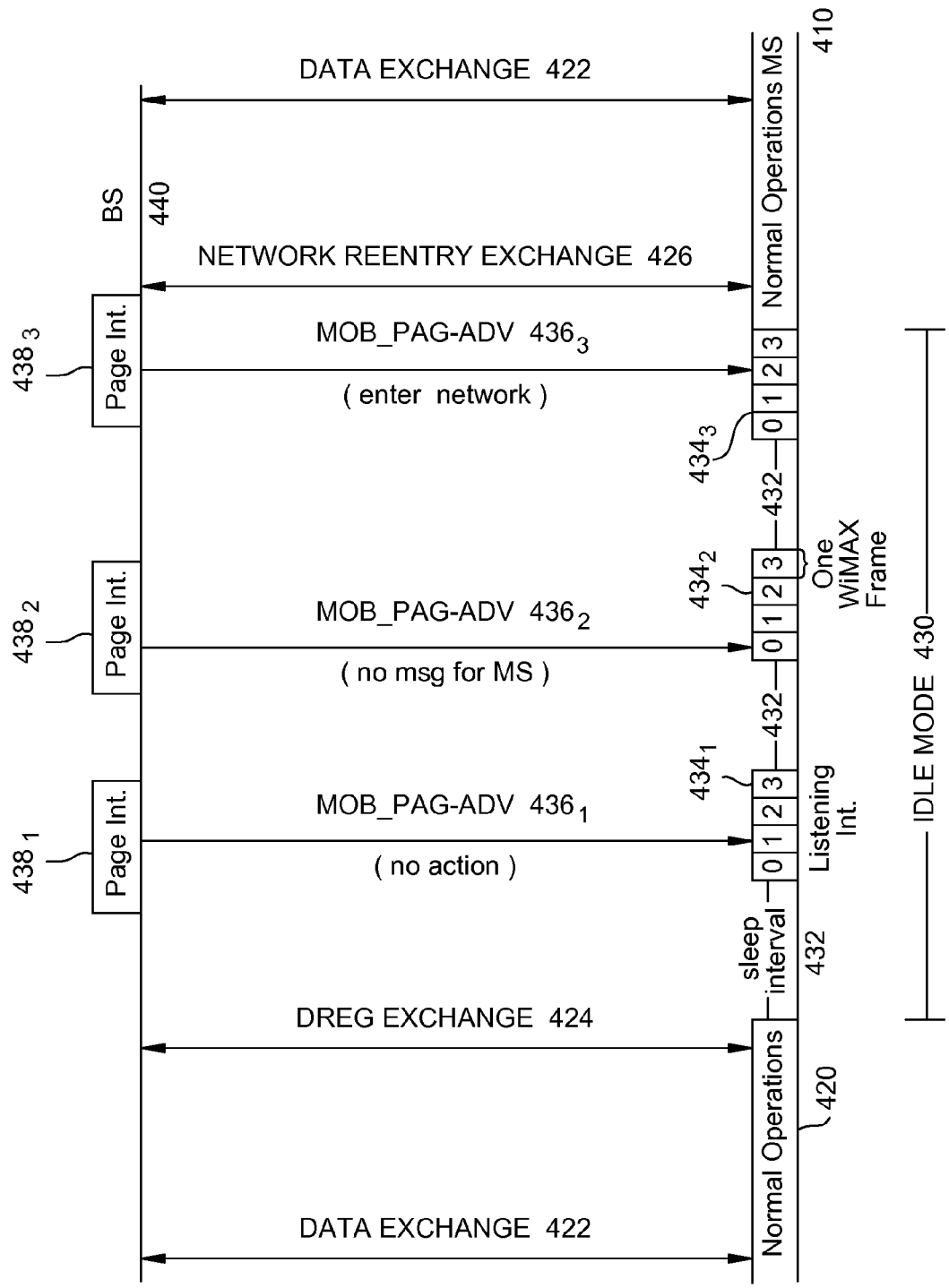
FIG. 4 illustrates a relationship between a starting frame of a listening interval, a sleep interval, a paging cycle, and a paging offset with respect to an idle mode.

FIG. 4 illustrates a relationship between a starting frame N of a listening interval 434, a sleep interval 432, a paging cycle 520, and a paging offset 530 with respect to an idle mode 430. The variability of the paging cycle, paging offset, and listening interval duration L, for different MSs, may result in a BS 440 broadcasting a MOB_PAG-ADV message 436 at non uniform times during subsequent listening intervals 434.

A MOB_PAG-ADV message 436 targeting an MS may occur at any frame number within an L frame-length listening interval (e.g., at frame N, N+1, . . . , N+L−1 assuming a listening interval starting at frame N). Thus, in a conventional system, an MS typically needs to stay awake for the whole paging listening interval to determine if a MOB_PAG-ADV message contains a match with its MAC address hash. Per WiMAX standards, a paging listening interval L can be as long as 5 frames, which may result in a substantial waste in terms of power consumption in the event that the MS is not paged.

However, embodiments of the present disclosure propose a paging technique that allows an MS to a low power state prior to the end of the listening interval. For certain embodiments, a common Paging_Listening_Interval_Length may be used for all MSs in the same paging group. While different MSs may have different Paging_Cycles and/or Paging_Offset values, these values may be controlled such that paging listening intervals begin in frames that are a multiple of the common Paging_Listening_Interval Length (L). This may facilitate how a BS may schedule page broadcast messages in an organized manner.

Figure 5A:
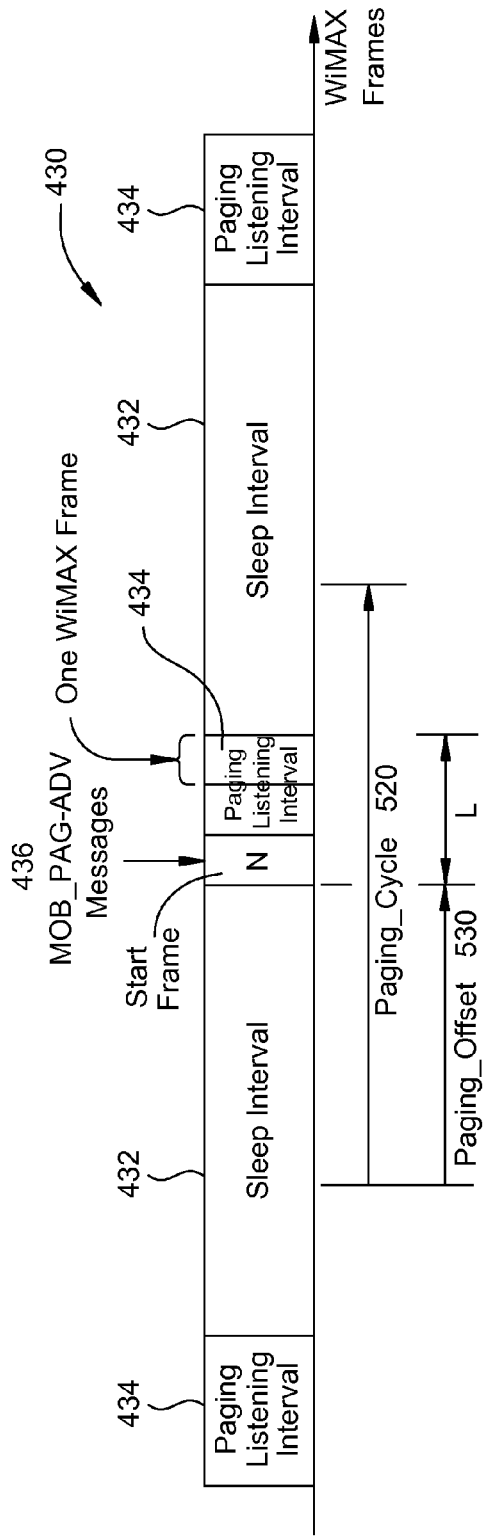
FIG. 5 illustrates paging interval parameters with paging cycle and the paging offset values standardized across mobile station paging groups, in accordance with embodiments of the present disclosure.
Figure 5B:
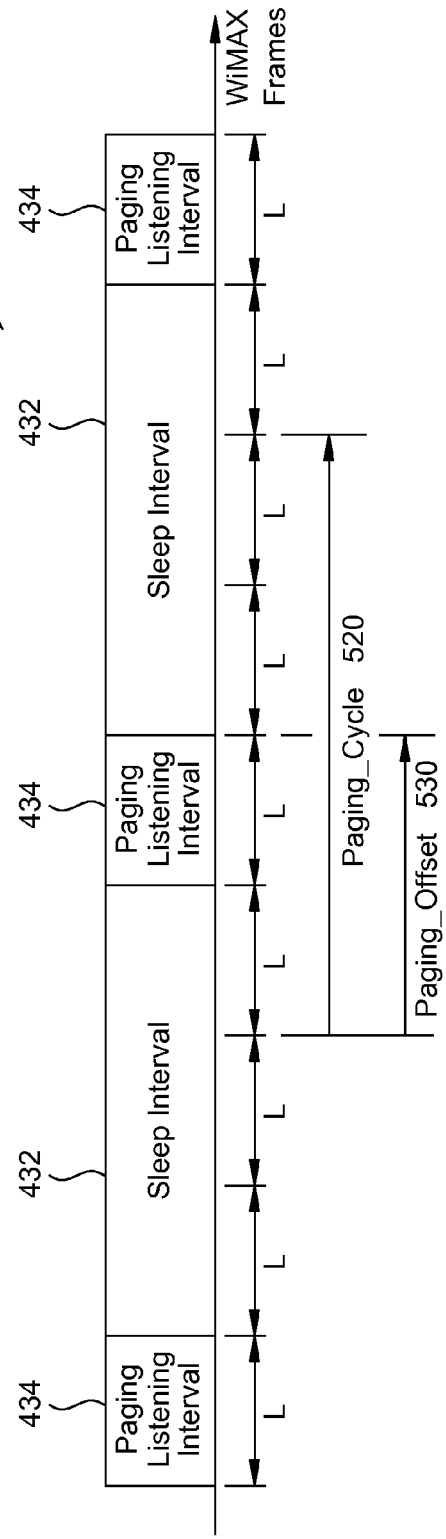

FIG. 5 illustrates that, although each MS 410 may have a different paging cycle and/or a different paging offset value, both the paging cycle 520 and the paging offset 530 values may be standardized such that they are wholly divisible by the duration of the listening interval L. This standardization of paging cycle and paging offset values may imply that the listening intervals 434, for all MSs, may start with a frame number N which is a multiple of L. Generally, this may be captured as described by Equation 2:

$$N = k*L \quad (2)$$

where k is a listening interval index. Moreover, this may yield a listening interval 434 that may be expressed as a set of frames {k*L, k*L+1 . . . k*L+L−1}.

Figure 6:
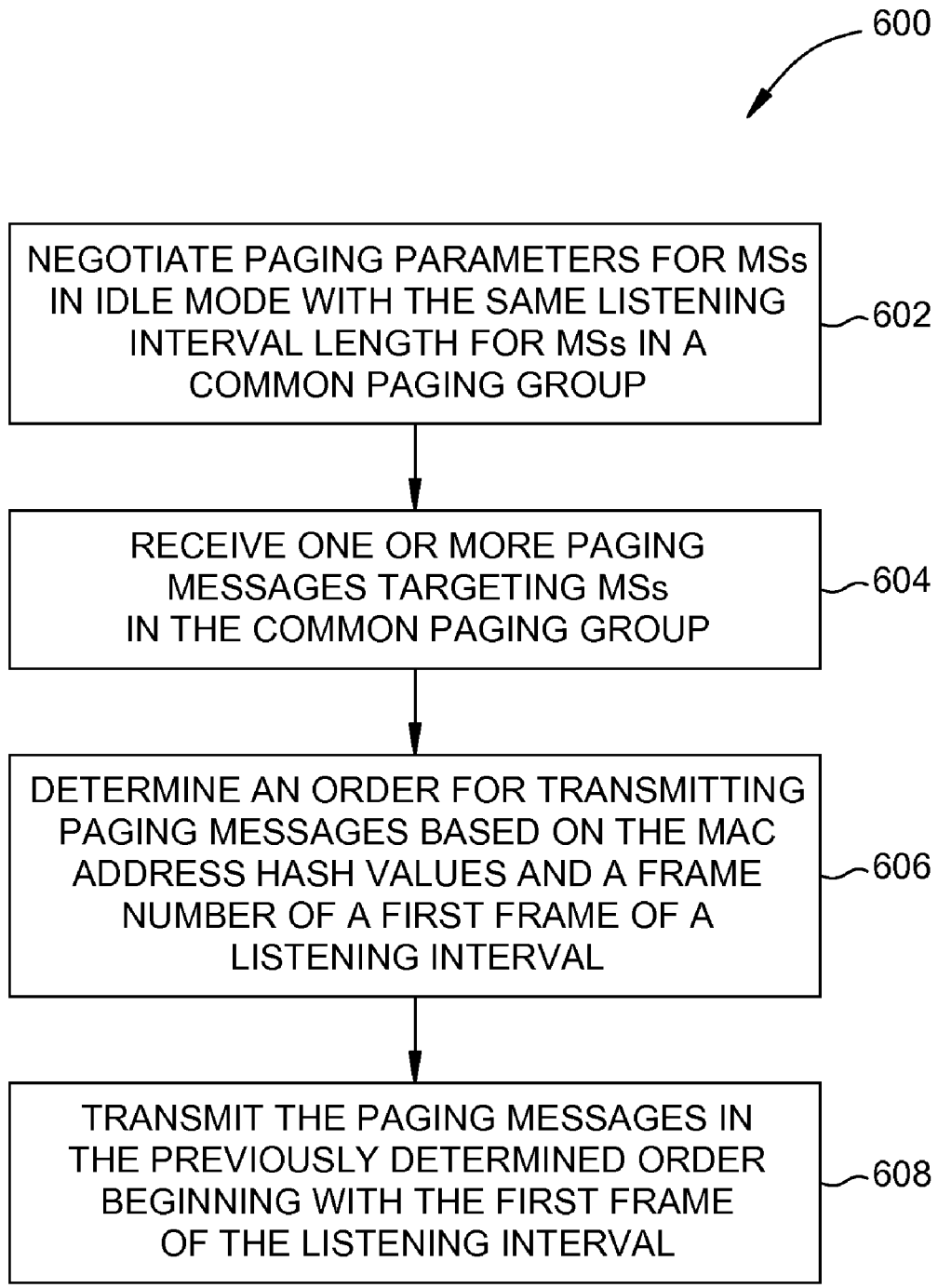
FIG. 6 illustrates example operations for paging mobile stations, in accordance with embodiments of the present disclosure.

FIG. 6 illustrates example operations 600 that may be performed, for example, by a WiMAX BS 440, for scheduling paging messages in a manner that allows MSs to return to low power state prior to the end of listening intervals.

Operations begin, at 602, with the BS 440 negotiating a set of idle mode paging parameters with the MS 410. As described above, the paging parameters may include a paging cycle 520, a paging offset 530, a listening interval duration L, and a listening interval start frame N. Although, each MS 410 may have a different paging cycle 520 and/or a different paging offset value 530, the BS 440 may standardize the duration of the listening interval L such that all MSs serviced by a common BS paging group have an identical listening interval duration. Additionally, the BS 440 may standardize the paging parameters such that both the paging cycle 520 and the paging offset value 530 are wholly divisible by the duration of the listening interval L.

At 604, the BS 440 may receive (from the network) one or more paging messages targeting one or more MSs serviced by the common BS paging group. At 606, the BS 440 may determine an order for transmitting the paging messages within a MOB_PAG-ADV message 436, for example, based on a MAC address hash value and a frame number N of the first frame of a listening interval 434. As will be described below, the order may also be determined based on the listening interval index k.

At 608, the BS 440 may transmit a MOB_PAG-ADV message 436 containing paging messages in the previously determined order beginning with the first frame N of the listening interval 434. As previously described, each MOB_PAG-ADV message may contain one or more 24-bit MAC Address Hash values (i.e., a hashed value of the full 48-bit MAC address of a MS 410). When the MS 410 sees a match between the 24-bit MAC Address Hash and its own 48-bit MAC address, the MS 410 may determine that this MOB_PAG-ADV 436 is destined for itself.

Exemplary Paging Order for a Given Interval

Certain embodiments of the present disclosure may allow the BS 440 to determine an order for transmitting the paging messages within a MOB_PAG-ADV message 436 by dividing the MSs, serviced by the common BS paging group, into M MAC address hash groups. M groups could be determined, for example, by placing MSs in groups 0 to M−1 based on their MAC address hash value h, based on a simple equation, such as h mod M.

For certain embodiments, the BS and MS may agree on the group number M, for example, via a deregistration process performed before entering the idle mode. For example, the BS may provide the group number M to the MS in a response to a deregistration request.

Paging messages may then be transmitted, within a listening interval in the established order (with MSs in group 0 being sent first, MSs in group 1 next, until group M−1 as one example). Thus, if an MS in group 0 detects a MOB_PAG-ADV message in a given frame that does not contain a MAC address hash match, but does contain a MAC address hash for an MS in group 1 (a later group), that MS may promptly return to sleep knowing it will not miss a paging message.

For certain embodiments, the established order of paging messages for certain MAC address hashes may also determined based on the listening interval index k. In this manner, the order may be rotated over different listening intervals. MAC address hashes sent first in order in one listening interval may be sent later in subsequent listening intervals, so the established order is evenly distributed across different MAC address hash values. For example, the BS 440 may decide the order of MS address hash groups based on the remainder of the quotient of the sum of the MAC address hash of the MS h and a listening interval index k divided by the number of MAC address hash groups M, as described by Equation 3:

$$\text{MAC\_Address\_Hash\_Group\_Order} = (h+k) \bmod M \quad (3)$$

Using a convention such as this, the order to which the MS MAC address hash group is transmitted may vary based on a listening interval index k.

For MOB_PAG-ADV messages with multiple MAC address hashes scheduled to be transmitted during a present listening interval 434, a first MAC address hash h1 may be sent before a second MAC address hash h2 if the MAC address group order associated with h1, as determined by Equation 3, is smaller than the MAC address group order associated with h2, assuming that the start of the current listening interval 434 began with frame number k*L.

For example, if the start of the current listening interval 434 began at frame 0 (i.e., N=0), the duration of the listening interval 434 was negotiated to be 4 frames (i.e., L=4), and the number of MAC address groups was determined to be 3 (i.e., M=3), then the listening interval index k may be determined by taking the quotient of the start frame N divided by the duration of the listening interval L, which would yield k=0.

Accordingly, if there were paging messages for 3 MSs to be sent during the current listening interval (e.g., MS0, MS1, and MS2) and the MAC address hash of MS0 (i.e., h0) equaled 999, the MAC address hash of MS1 (i.e., h1) equaled 1000, and the MAC address hash of MS2 (i.e., h2) equaled 1001, then the MAC address group order of mobile stations MS0, MS1, and MS2 would be 0, 1, and 2, respectively. Consequently, the paging message for MS0 would be sent first, followed by the paging message for MS1, and then the paging message for MS2.

However, if the next listening interval 434 began at frame 16 (i.e., N=16), the duration of the listening interval remained 4 frames (i.e., L=4), and the number of MAC address groups remained 3 (i.e., M=3), then the listening interval index k would be 4. Moreover, if there were paging messages for the same three MSs (i.e., MS0, MS1, and MS2) with MAC address hashes h0=999, h1=1000, and h2=1001, then the MAC address group order of mobile stations MS0, MS1, and MS2, as determined by Equation 3, would be 1, 2, and 0, respectively. Consequently, the paging message for MS2 would be sent first, followed by the paging message for MS0, and then the paging message for MS1.

By allowing the BS 440 to determine an order for transmitting the paging messages within a MOB_PAG-ADV message 436, the MS 410 may be allowed to enter a low power state prior to the end of the listening interval 434. For example, if a MOB_PAG-ADV message is received and the MS 410 is able to determine the MAC address hash group value of current paging messages corresponds to a hash group value that is later in order than the MAC address hash group value of the MS 410, then the MS 410 may promptly return to a low power state 432 prior to the end of the current listening interval 434.

In other words, because the MAC address hash group value of MS 410 was earlier in time than the observed MAC address hash group value and there was no match for the MAC address hash group value of MS 410, MS 410 knows there will not be a match in later frames of the listening interval. Thus, MS 410 may promptly return to sleep without risk of missing a page.

Some embodiments may also allow the BS 440 to standardize the timing of the transmission of MOB_PAG-ADV messages 436 within a listening interval 434. For example, the BS 440 may establish that the transmission of MOB_PAG-ADV messages 436 starts during the first frame N of a listening interval. Moreover, the BS 440 may establish that if there is additional content to a MOB_PAG-ADV message 436, but the BS 440 cannot complete transmission in the current frame, the BS may continue the transmission during the next immediate frame in the listening interval 434.

Accordingly, if the MS 410 encounters a period during the listening interval 434 in which there is no MOB_PAG-ADV message 436, the MS 410 may promptly return to a low power state 432 prior to the end of the current listening interval 434. For example, if the MS 410 wakes up and enters the listening interval 434 and does not receive a MOB_PAG-ADV message 436 or if the MS 410 is listening to a MOB_PAG-ADV message 436 and the transmission ends prior to the end of the listening interval 434, the MS 410 may promptly return to a low power state 432.

Figure 7:
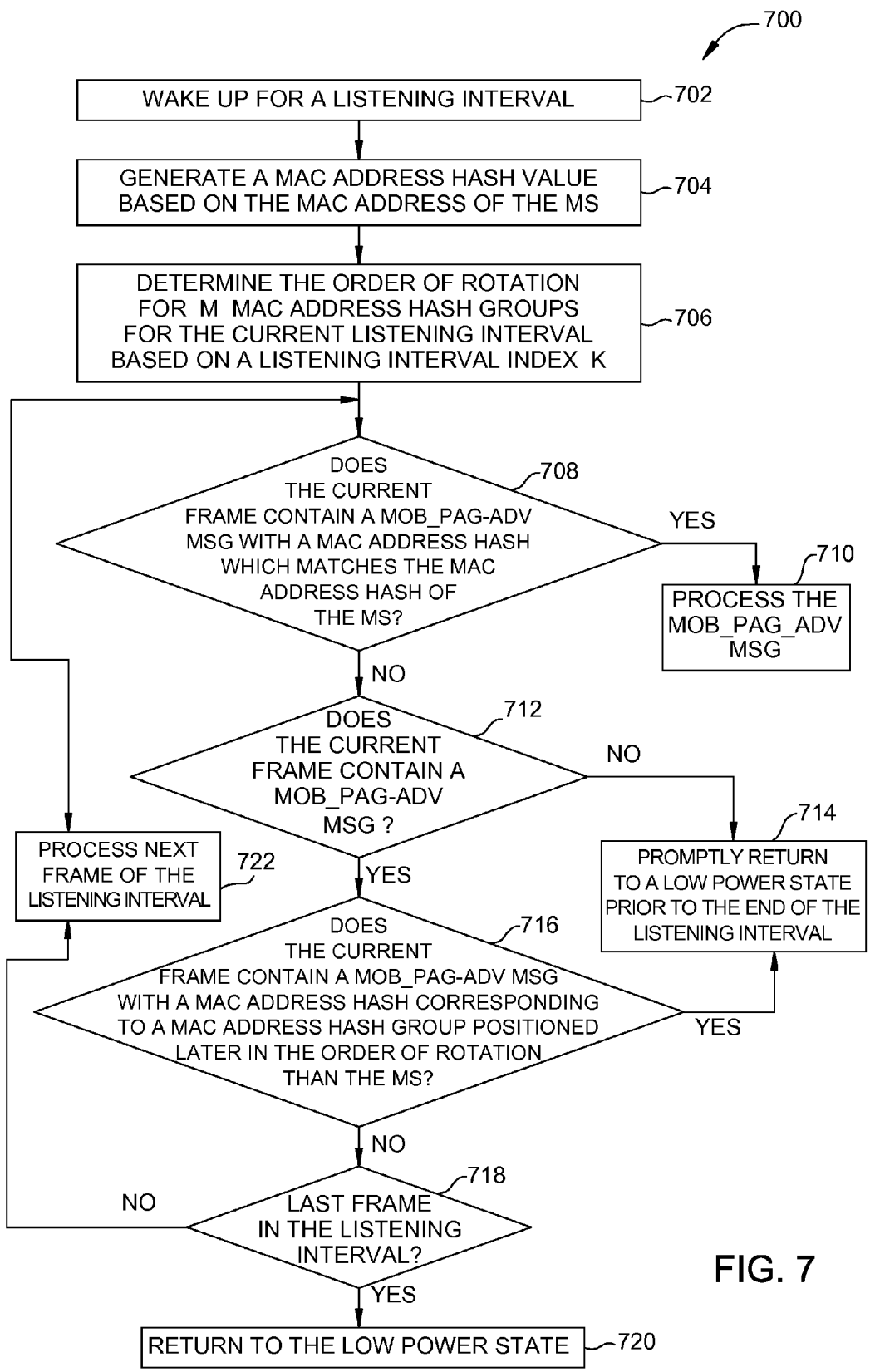
FIG. 7 illustrates example operations for detecting a paging message, in accordance with embodiments of the present disclosure.

FIG. 7 illustrates example operations 700 that may be performed, for example, by a WiMAX MS 410 during a listening interval. The example operations may assume specifically organized MOB_PAG-ADV messages 436 and, thus, an MS may determine if it is appropriate to re-enter a low power state 432 prior to the end of an idle mode listening interval 434.

The operations begin, at 702, with the MS 410 waking up from a low power state 432 and beginning a listening interval 434. In some embodiments, a set of paging parameters may be negotiated, prior to the MS 410 entering the low power state 432. As previously described, the set of paging parameters may include a paging cycle value 520, a paging offset value 530, a listening interval duration L, and a frame number N at which the listening interval 434 begins.

At 704, the MS 410 may determine a 24-bit MAC address hash based on the 48-bit MAC address associated with the MS 410. For certain embodiments, the 24-bit MAC address hash may be generated in accordance with the IEEE 802.16 standard. For example, the MAC address hash may be obtained by computing a 24-bit cyclic redundancy check (CRC24) on the 48-bit MAC address associated with the MS 410.

At 706, the MS 410 may determine the order of rotation for the M MAC address hash groups for the current listening interval 434 based on a listening interval index k. As previously described, the listening interval index k may be determined by taking the quotient of the start frame N of the listening interval 434 divided by the duration of the listening interval L. The MS 410 may then determine the order of rotation as described by Equation 3, above.

It should be noted that operations 704 and 706 may be performed in any order during operations 700 or may be performed prior to the commencement of operations 700. For example, the MS 410 may calculate its MAC address hash value upon entering the network and receiving a MAC address. Additionally, the MS 410 may determine the order of rotation for the MAC address hash groups for a subsequent listening interval before entering the low power state 432.

At 708, the MS 410 may evaluate a current frame in the listening interval 434 and determine if a MOB_PAG-ADV message 436 contains a MAC address hash which matches the MAC address hash associated with the MS 410.

If the current frame in the listening interval 434 has a MOB_PAG-ADV message 436 with a MAC address hash which is associated with the MS 410, the MS 410 may process the MOB_PAG-ADV message 436 and execute the action(s) indicated by the message, at 710.

However, if the current frame in the listening interval 434 does not contain a MOB_PAG-ADV message 436 with a MAC address hash which is associated with the MS 410, the MS 410 may evaluate the current frame in the listening interval 434 and determine if the frame has a MOB_PAG-ADV message 436 at all, as illustrated at 712.

If the current frame in the listening interval 434 does not contain a MOB_PAG-ADV message 436 at all, the MS 410 may promptly return to a low power state prior to the end of the listening interval 434, as illustrated at 714. This assumes that, in this example, the BS 440 would broadcast a MOB_PAG-ADV message 434 from the first frame N of the listening interval 434 and in every subsequent frame until there is no remaining content, as described above. Thus, the MS 410 may deduce that the BS 440 does not have a message destined for the MS 410 during the current listening interval 434, if there is no MOB_PAG-ADV message 436 at all during the current frame of the current listening interval 434.

However, if the current frame in the listening interval 434 does contain a MOB_PAG-ADV message 436, as illustrated at 716, the MS 410 may evaluate the current frame and determine if the frame contains a MOB_PAG-ADV message 436 with a MAC address hash corresponding to a MAC address hash group positioned later in the order of rotation than the MS 410.

If the current frame contains a MOB_PAG-ADV message 436 with a MAC address hash corresponding to a MAC address hash group positioned later in the order of rotation than the MS 410, then the MS 410 may promptly return to a low power state prior to the end of the listening interval 434, as illustrated at 714. Since the BS 440 would broadcast all of the paging messages associated with a MAC address hash group before proceeding to the messages for a MAC address hash group later in the order of rotation, the MS 410 may deduce that the BS 440 does not have a message destined for the MS 410 during the current listening interval 434, if there is a paging message associated with a MAC address hash group later in the order of rotation than the MS 410.

If, however, the current frame does not contain a MOB_PAG-ADV message 436 with a MAC address hash corresponding to a MAC address hash group positioned later in the order of rotation than the MS 410, as illustrated at 718, the MS 410 may evaluate the current frame and determine, based on the current frame number, starting frame number N, and listening interval duration L, if the frame is the last frame in the listening interval 434.

If the current frame of the listening interval 434 is not the last frame, then the MS 410 may proceed to the next frame of the listening interval 434 repeating operations 708-718. However, if the current frame is the last frame of the listening interval 434, then the MS 410 may return to a low power state 432, at 720 (e.g., at the conventional time).

It should be noted that operations 708, 712, and 716 may be performed in any order. For example, the MS 410 may determine if the current frame contains a MOB_PAG-ADV message 436 at all before determining if the MOB_PAG-ADV message 436 has a paging message with a MAC address hash which matches the MAC address hash of the MS 410.

FIGS. 8A-D illustrate various scenarios described above with reference to the operations of FIG. 7. The examples illustrate how the listening interval of an MS 410 may, effectively, be shortened in certain scenarios, allowing the MS 410 to return to sleep prior to end of the time allotted to conventional listening intervals. Each of the examples assumes the MS 410 has a MAC address hash value of 'H.'

Figure 8A:
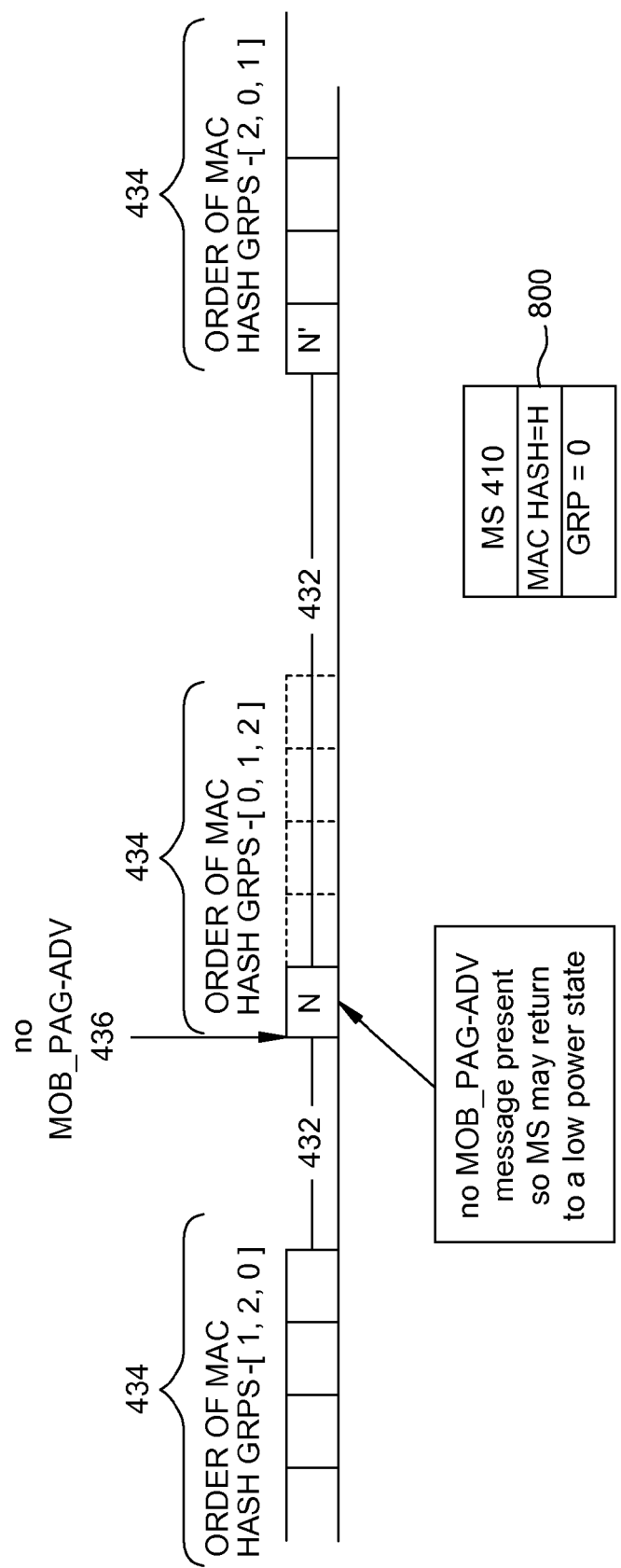
FIGS. 8A-D illustrate how a mobile station may be able to return to a low power state early prior to the end of a listening interval, in accordance with embodiments of the present disclosure.

FIG. 8A illustrates an example in which the MS 410 determines, based on the MAC hash value of 'H' and listening interval index k, that the MS 410 belongs to MAC address hash group 0 for the current listening interval 434. The MS 410 may also able to determine that the order of rotation for the current listening interval 434 is [group 0, group 1, group 2]. However, the MS 410 detects that there is no MOB_PAG-ADV message 436 during the first frame N of the listening interval 434. Accordingly, the MS 410 is able to promptly return to a low power state 432 after the first frame N.

FIG. 8B again assumes that the MS 410 belongs to MAC address hash group 0 for the current listening interval 434. In contrast to FIG. 8A, in this example, the MS 410 receives a MOB_PAG-ADV message 436 in the first frame N of the listening interval 434. The MS 410 determines there is no paging message with a MAC address hash matching the MAC address hash associated with the MS 410 in the current frame. Additionally, the MS 410 determines that the frame contains a MAC address hash corresponding to a MAC address hash group positioned later in the order of rotation than the MS 410. Specifically, the MS 410 sees a MAC address hash associated with MAC address hash group 1. Since the order of rotation is [group 0, group 1, group 2], the MS 410 determines it may promptly return to the low power state following the first frame N of the paging interval 434 with no risk of missing a paging message.

Figure 8B:
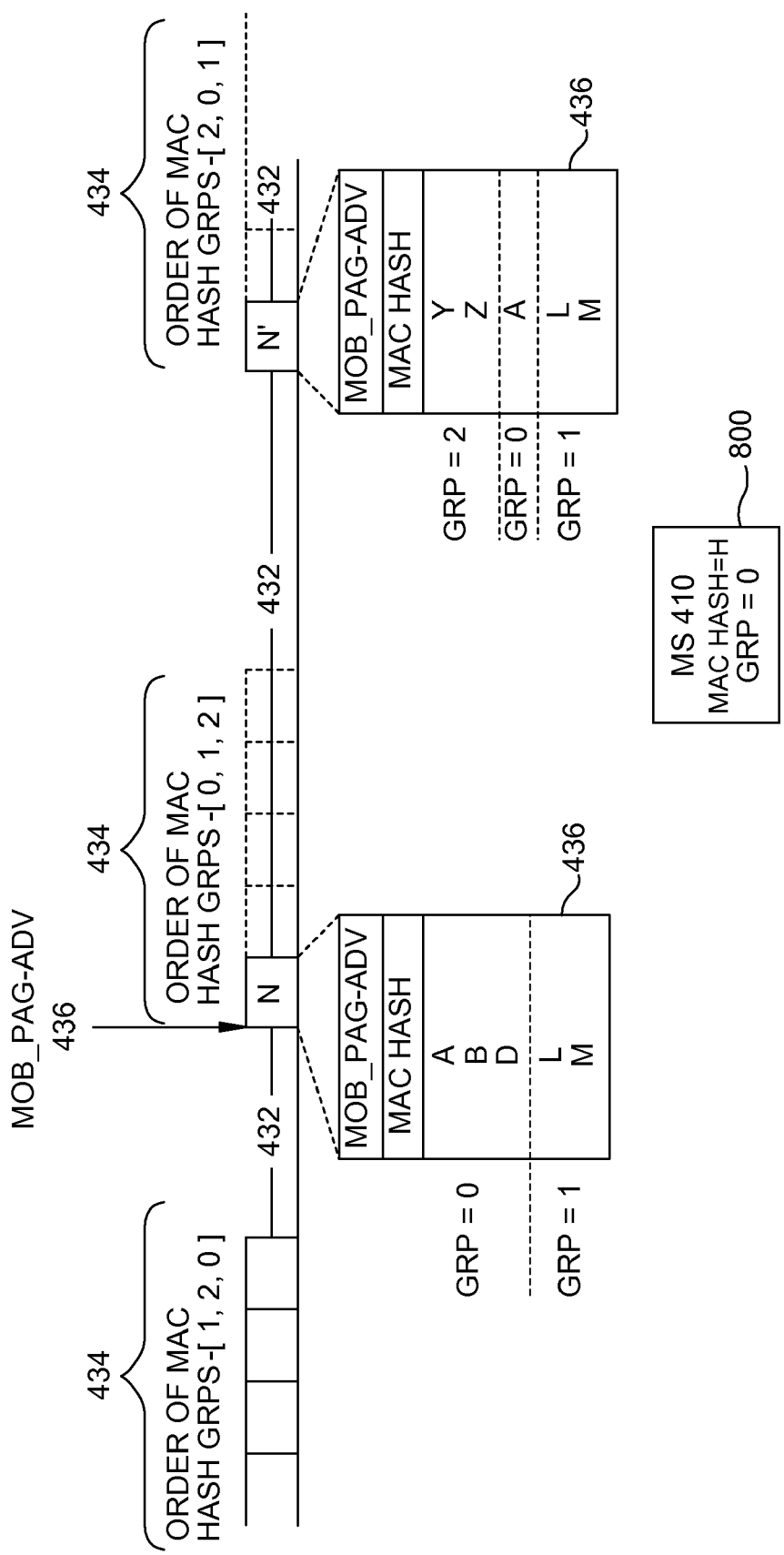

FIG. 8B further illustrates that during a subsequent listening interval (with index k+1), the order of rotation is determined to be [group 2, group 0, group 1]. Again the MS 410 receives a MOB_PAG-ADV message 436 in the first frame (N'=N+L) of the subsequent listening interval. In the present example, the MOB_PAG-ADV message 436 contains only 2 MAC address hash values corresponding to group 2 and only 1 MAC address hash value corresponding to group 0, which does not match the MAC address hash 'H' of the MS 410. As illustrated, the MOB_PAG-ADV message in the first frame also includes MAC address hash values corresponding to group 1, which occurs after group 0. Consequently, the MS 410 is again able to promptly return to the low power state 432 immediately following the first frame.

Figure 8C:
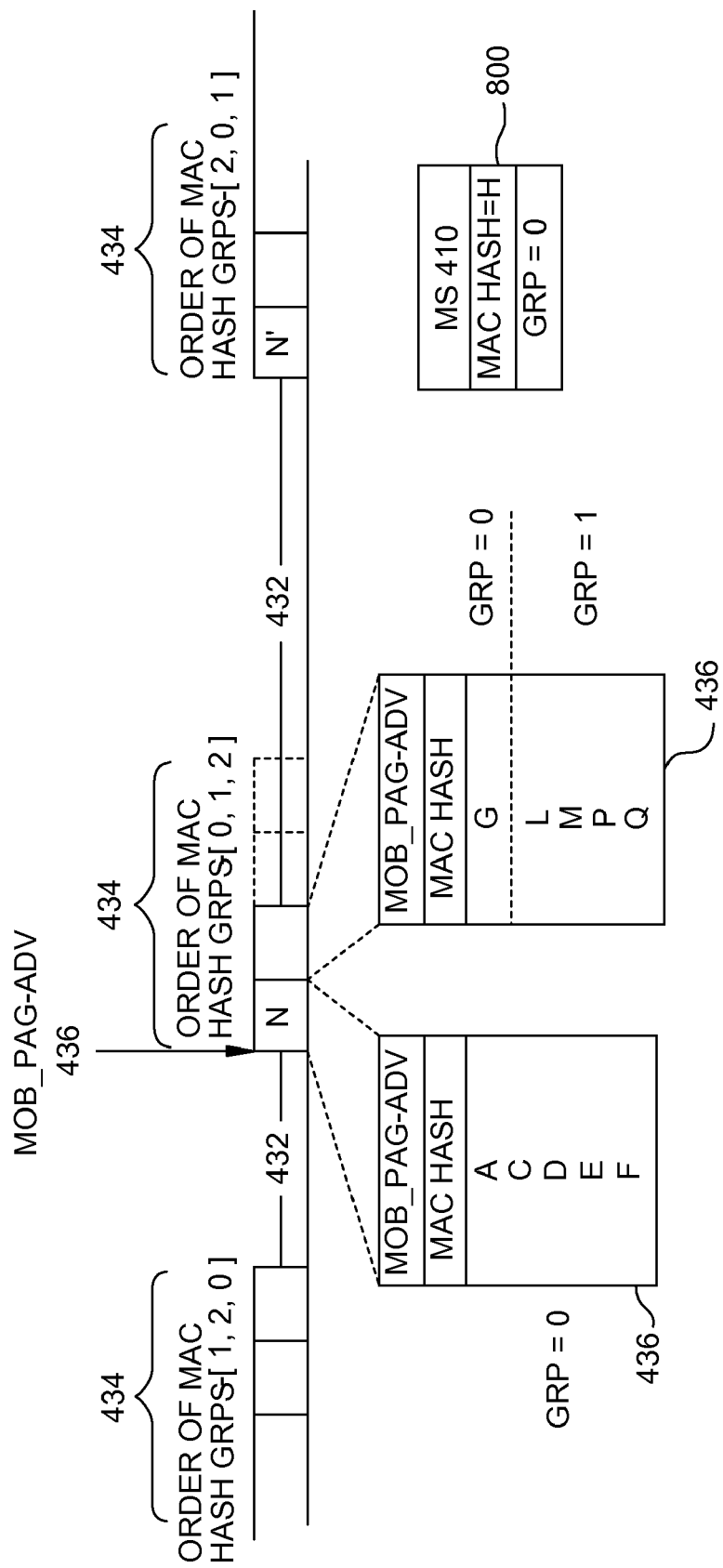

FIG. 8C illustrates an example in which the MS 410 has to listen for two frames of the listening interval before being able to deduce it is safe to return to the low power state 432 with no risk of missing a paging message. In this example, the first frame contains a MOB_PAG-ADV message, but the message does not contain a MAC address hash associated with a MAC address hash group positioned later in the order of rotation than the MS 410. Thus, the MS 410 proceeds to the subsequent frame of the listening interval 434, where it does find a MAC address hash associated with a MAC address hash group (group 1) positioned later in the order of rotation than the MS 410. Consequently, the MS 410 is able to promptly return to the low power state 432 after the second frame without the risk of missing a paging message.

Figure 8D:
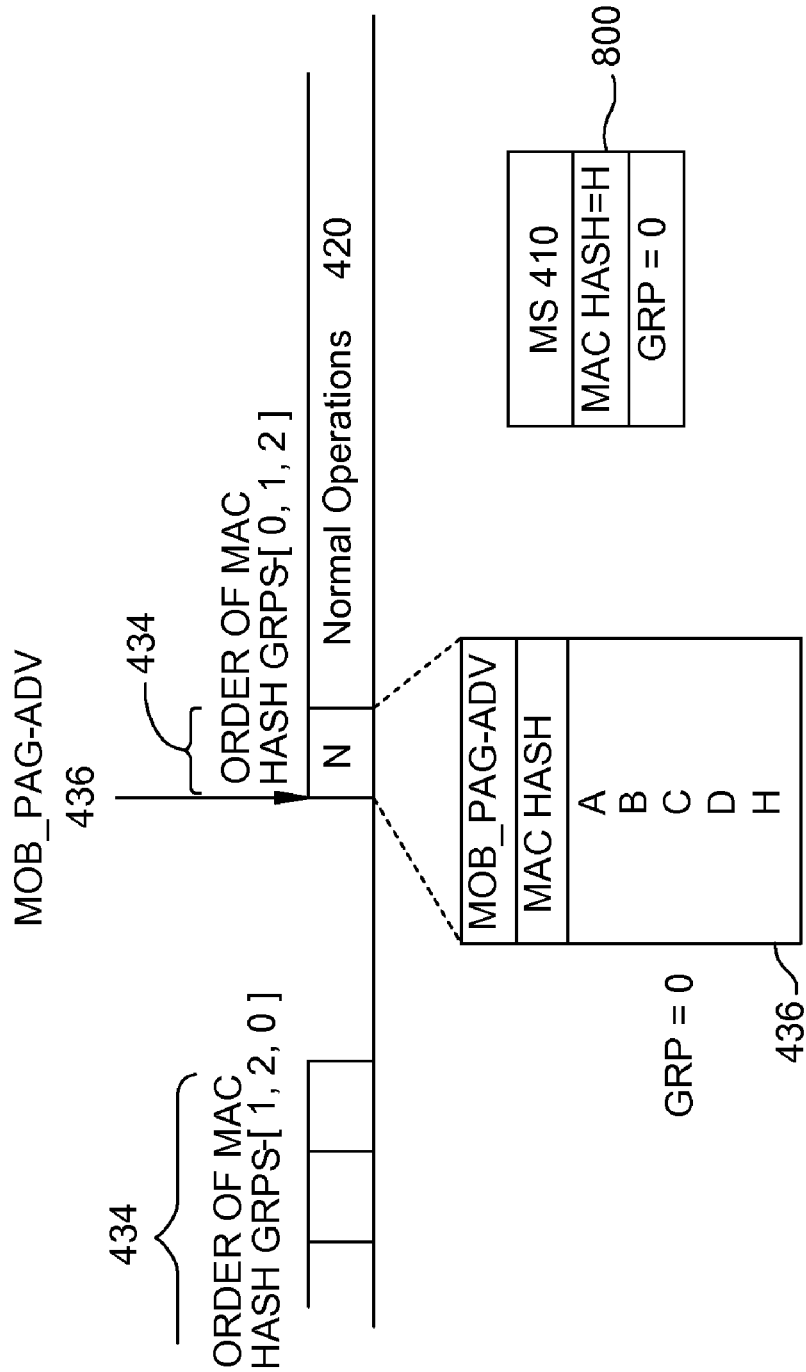

FIG. 8D illustrates an example in which the MS 410 receives a MOB_PAG-ADV message 436 which does contain a MAC address hash that matches the MAC address hash associated with the MS 410. Accordingly, the MS 410 processed the MOB_PAG-ADV message 436 and executed the action indicated by the message. In the present example, the message may have contained the action code 0b10 indicating the MS 410 was to enter the network.

Figure 6A:
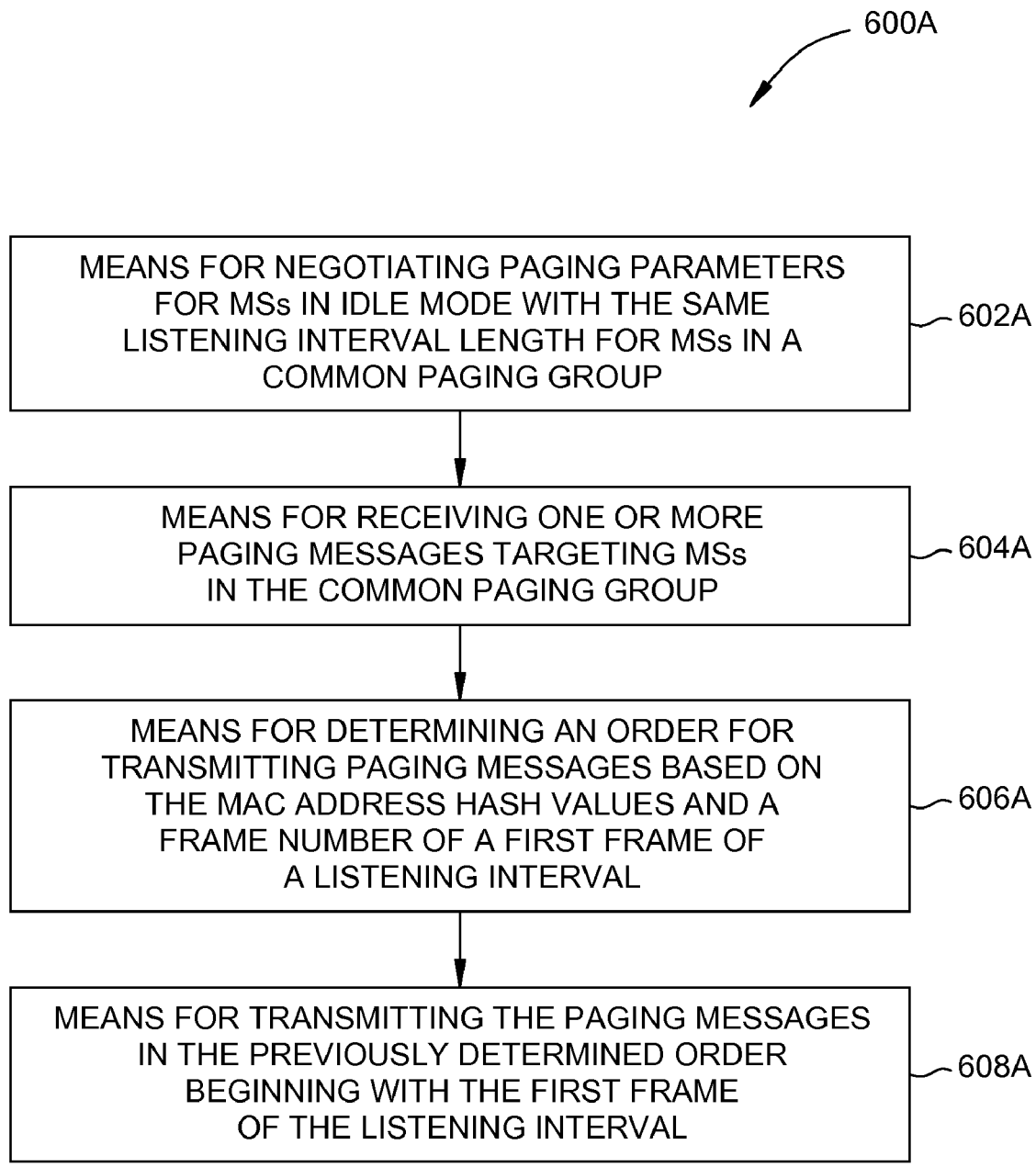
FIG. 6A illustrates example components capable of performing the operations of FIG. 6.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 602-608 illustrated in FIG. 6 correspond to means-plus-function blocks 602A-608A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present invention, other and further embodiments of the invention may be devised without departing from the basic scope thereof, and the scope thereof is determined by the claims that follow.

What is claimed is:

1. A method of scheduling paging messages in a wireless communications system, comprising:
    negotiating paging parameters for a paging group of mobile stations in idle mode, wherein the paging parameters comprise a common listening interval for the mobile stations in the paging group;
    receiving paging messages targeting the mobile stations in the paging group;
    grouping the mobile stations in the paging group into a number of sub-groups;
    determining an order for transmitting the paging messages within the common listening interval, wherein the order specifies a sequential order for transmitting the paging messages targeting the mobile stations in different sub-groups of the paging group,
    wherein the determining the order for transmitting the paging messages within the common listening interval comprises:
    determining a sub-group associated with said each paging message based on a MAC address hash value generated from a MAC address of a targeted mobile station, and
    determining an order of the sub-group based on a remainder of a quotient of a sum of the MAC address hash value of the targeted mobile station and an index of the common listening interval divided by the number of sub-groups; and
    transmitting the paging messages, by sub-group, in the determined order using a base station.

2. The method of claim 1, wherein the index of the common listening interval is determined based on a frame number of a start frame of the common listening interval.

3. The method of claim 1, further comprising:
    determining the number of sub-groups of mobile stations; and
    transmitting the number of sub-groups to one or more of said number of sub-groups of mobile stations.

4. A method for monitoring for paging messages by a mobile station in a wireless communications system, comprising:
    exiting a lower power state of an idle mode to monitor for the paging messages during a current listening interval;
    determining a group number for the mobile station;
    determining an order of group numbers that include the group number of the mobile station to receiving the paging messages in the current listening interval by determining a remainder of a quotient of a sum of a MAC address hash value generated from a MAC address of a mobile station and an index of the current listening interval divided by a total number of groups of mobile stations; and
    returning to the low power state prior to the end of the current listening interval, in response to determining that a frame in the current listening interval contains a mobile page advertisement message that does not target the mobile station and does target a mobile station in a group that occurs later in the determined order of the group numbers than the group number determined for the mobile station.

5. The method of claim 4, wherein the determining the group number for the mobile station comprises:
    determining the group number for the mobile station based, at least in part, on the MAC address hash value generated from the MAC address of the mobile station.

6. The method of claim 4, wherein
    different orders of group numbers based, at least in part, on an index of the current listening interval, such that different orders of group numbers are determined for different listening interval indexes.

7. The method of claim 4, further comprising:
    receiving a number M specifying the total number of groups of mobile stations; and
    determining the group number for the mobile station based, at least in part, on the MAC address hash value generated from the MAC address of the mobile station and the number M.

8. A base station for scheduling paging messages in a wireless communications system, the base station comprising:
    a memory; and
    at least one processor coupled to the memory and configured for:
    negotiating paging parameters for a paging group of mobile stations in idle mode, wherein the paging parameters comprise a common listening interval for the mobile stations in the paging group;
    receiving the paging messages targeting the mobile stations in the paging group;
    grouping the mobile stations in the paging group into a number of sub-groups;
    determining an order for transmitting the paging messages within the common listening interval, wherein the order specifies a sequential order for transmitting the paging messages targeting the mobile stations in different sub-groups of the paging group,
    wherein the at least one processor determines the order for transmitting the paging messages within the common listening interval by:
    determining a sub-group associated with said each paging message based on a MAC address hash value generated from a MAC address of a targeted mobile station, and
    determining an order of the sub-group based on a remainder of a quotient of a sum of the MAC address hash value of the targeted mobile station and an index of the common listening interval divided by the number of sub-groups; and
    transmitting the paging messages, by the sub-group, in the determined order.

9. The base station of claim 8, wherein the index of the common listening interval is determined based on a frame number of a start frame of the common listening interval.

10. The base station of claim 8, in which the at least one processor is further configured for:
    determining the number of sub-groups of mobile stations; and transmitting the number of sub-groups to one or more of said number of sub-groups of mobile stations.

11. An apparatus for monitoring paging messages by a mobile station in a wireless communications system, comprising:
- a memory; and
- at least one processor coupled to the memory and configured for:
  - exiting a low power state of an idle mode to monitor for the paging messages during a current listening interval;
  - determining a group number for the mobile station;
  - determining an order of group numbers that include the group number of the mobile station to receiving the paging messages in the current listening interval by determining the remainder of a quotient of a sum of a MAC address hash value generated from a MAC address of a mobile station and an index of the current listening interval divided by a total number of groups of mobile stations; and
  - returning to the low power state prior to an end of the current listening interval, in response to determining that a frame in the current listening interval contains a mobile page advertisement message that does not target the mobile station and does target a mobile station in a group that occurs later in the determined order of the group numbers than the group number determined for the mobile station.

12. The apparatus of claim 11, in which the at least one processor is further configured for determining the group number for the mobile station by determining the group number for the mobile station based, at least in part, on the MAC address hash value generated from the MAC address of the mobile station.

13. The apparatus of claim 11, wherein the at least one processor determines different orders of group numbers for different listening interval indexes.

14. The base apparatus of claim 11, in which the at least one processor is further configured for:
- receiving a number M specifying the total number of groups of mobile stations; and
- determining the group number for the mobile station based, at least in part, on the MAC address hash value generated from the MAC address of the mobile station and the number M.

15. An apparatus for scheduling paging messages in a wireless communications system, the apparatus comprising:
- means for negotiating paging parameters for a paging group of mobile stations in idle mode, wherein the paging parameters comprise a common listening interval for the mobile stations in the paging group;
- means for receiving the paging messages targeting the mobile stations in the paging group;
- means for grouping the mobile stations in the paging group into a number of sub-groups;
- means for determining an order for transmitting the paging messages within the common listening interval, wherein the order specifies a sequential order for transmitting the paging messages targeting the mobile stations in different sub-groups of the paging group,
- wherein the means for determining the order for transmitting the paging messages within the common listening interval comprises:
- means for determining a sub-group associated with said each paging message based on a MAC address hash value generated from a MAC address of a targeted mobile station, and
- means for determining an order of the sub-group based on a remainder of a quotient of a sum of the MAC address hash value of the targeted mobile station and an index of the common listening interval divided by the number of sub-groups; and
- means for transmitting the paging messages, by the sub-group, in the determined order.

16. The apparatus of claim 15, wherein the index of the common listening interval is determined based on a frame number of a start frame of the common listening interval.

17. The apparatus of claim 15, further comprising:
- means for determining the number of sub-groups of mobile stations; and
- means for transmitting the number of sub-groups to one or more of said number of sub-groups of mobile stations.

18. An apparatus for monitoring paging messages by a mobile station in a wireless communications system, the apparatus comprising:
- means for exiting a low power state of an idle mode to monitor for the paging messages during a current listening interval;
- means for determining a group number for the mobile station;
- means for determining an order of group numbers that include the group number of the mobile station to receive the paging messages in the current listening interval by determining a remainder of a quotient of a sum of a MAC address hash value generated from a MAC address of a mobile station and an index of the current listening interval divided by a total number of groups of mobile stations; and
- means for returning to the low power state prior to an end of the current listening interval, in response to determining that a frame in the current listening interval contains a mobile page advertisement message that does not target the mobile station and does target a mobile station in a group that occurs later in the determined order of the group numbers than the group number determined for the mobile station.

19. The apparatus of claim 18, wherein the means for determining the group number for the mobile station is configured to determine the group number for the mobile station based, at least in part, on the MAC address hash value generated from the MAC address of the mobile station.

20. The apparatus of claim 18, wherein the means for determining the order of the group numbers to receive the paging messages in the current listening interval determines different orders of group numbers for different listening interval indexes.

21. The apparatus of claim 18, further comprising:
- means for receiving a number M specifying the total number of groups of mobile stations; and
- means for determining the group number for the mobile station based, at least in part, on the MAC address hash value generated from the MAC address of the mobile station and the number M.

22. A computer-program product for scheduling paging messages in a wireless communications system, comprising a non-transitory computer readable medium having instructions stored thereon, the instructions being executable by one or more processors and the instructions comprising:
- instructions for negotiating paging parameters for a paging group of mobile stations in idle mode, wherein the paging parameters comprise a common listening interval for the mobile stations in the paging group;
- instructions for receiving the paging messages targeting the mobile stations in the paging group;

instructions for grouping the mobile stations in the paging group into a number of sub-groups;

instructions for determining an order for transmitting the paging messages within the common listening interval, wherein the order specifies a sequential order for transmitting the paging messages targeting mobile stations in different sub-groups of the paging group, wherein the instructions for determining the order for transmitting the paging messages within the common listening interval comprise:

instructions for determining a sub-group associated with said each paging message based on a MAC address hash value generated from a MAC address of a targeted mobile station, and instructions for determining an order of the sub-group based on a remainder of a quotient of a sum of the MAC address hash value of the targeted mobile station and an index of the common listening interval divided by a number of sub-groups; and instructions for transmitting the paging messages, by sub-group, in the determined order.

23. The computer-program product of claim 22, wherein the index of the common listening interval is determined based on a frame number of a start frame of the common listening interval.

24. The computer-program product of claim 22, wherein the instructions further comprise:

instructions for determining the number of sub-groups of mobile stations; and instructions for transmitting the number of sub-groups to one or more of said number of sub-groups of mobile stations.

25. A computer-program product for monitoring paging messages by a mobile station in a wireless communications system, comprising a non-transitory computer readable medium having instructions stored thereon, the instructions being executable by one or more processors and the instructions comprising:

instructions for exiting a low power state of an idle mode to monitor for the paging messages during a current listening interval;

instructions for determining a group number for the mobile station;

instructions for determining an order of group numbers that include the group number of the mobile station to receive the paging messages in the current listening interval by determining a remainder of a quotient of a sum of a MAC address hash value generated from a MAC address of a mobile station and an index of the current listening interval divided by a total number of groups of mobile stations; and instructions for returning to the low power state prior to an end of the current listening interval, in response to determining that a frame in the current listening interval contains a mobile page advertisement message that does not target the mobile station and does target a mobile station in a group that occurs later in the determined order of the group numbers than the group number determined for the mobile station.

26. The computer-program product of claim 25, wherein the instructions for determining the group number for the mobile station comprise:

instructions for determining the group number for the mobile station based, at least in part, on the MAC address hash value generated from the MAC address of the mobile station.

27. The computer-program product of claim 25, wherein the instructions for determining the order of the group numbers to receive the paging messages in the current listening interval determines different orders of group numbers for different listening interval indexes.

28. The computer-program product of claim 25, wherein the instructions further comprise:

instructions for receiving a number M specifying the total number of groups of mobile stations; and instructions for determining the group number for the mobile station based, at least in part, on the MAC address hash value generated from the MAC address of the mobile station and the number M.

* * * * *